(12) United States Patent
Gani et al.

(10) Patent No.: US 7,183,367 B2
(45) Date of Patent: Feb. 27, 2007

(54) VINYL SULPHONE MODIFIED POLYMER

(75) Inventors: David Gani, Birmingham (GB);
Friedrich E. Kroll, Valby (DK);
Michael J. Plater, Aberdeen (GB);
John R. Morphy, Stirlingshire (GB);
David C. Rees, Vastra Froounda (SE)

(73) Assignee: N.V. Organon, Oss (NL)

( * ) Notice: Subject to any disclaimer, the term of this patent is extended or adjusted under 35 U.S.C. 154(b) by 226 days.

(21) Appl. No.: 10/799,912

(22) Filed: Mar. 12, 2004

(65) Prior Publication Data

US 2004/0186256 A1 Sep. 23, 2004

Related U.S. Application Data

(62) Division of application No. 09/485,195, filed as application No. PCT/GB98/02264 on Aug. 5, 1998, now abandoned.

(30) Foreign Application Priority Data

Aug. 5, 1997 (GB) ................................ 9716456.0

(51) Int. Cl.
*C08F 12/36* (2006.01)
*C08F 12/30* (2006.01)
(52) U.S. Cl. .................... 526/287; 526/286; 526/307.5; 526/348; 526/346
(58) Field of Classification Search ................ 526/286, 526/307.5, 348, 287, 346
See application file for complete search history.

(56) References Cited

U.S. PATENT DOCUMENTS 3,563,958 A 2/1971 Dorman .................... 260/78
3,948,821 A 4/1976 deBenneville ............ 260/2.5
4,600,641 A * 7/1986 Ogawa et al. ............. 204/616

FOREIGN PATENT DOCUMENTS

GB 2264301 A 8/1993
JP 63-220239 * 9/1988
JP 01235593 9/1989

OTHER PUBLICATIONS

International Search Report, No. PCT/GB98/02264, Nov. 23, 1998.
Database WPI, Derwent Abstract XP-002084167.

* cited by examiner

*Primary Examiner*—Ling-Sui Choi
(74) *Attorney, Agent, or Firm*—William P. Ramey, III; F. Aaron Dubberley; Susan Hess

(57) ABSTRACT

There is provided a polymer having a side chain of general formula (I) in which R may be any suitable alkyl, oxyalkyl, aryl or oxyaryl linking group R is preferably $C_{1-6}$ alkyl (especially —$CH_2$—), a benzene group or a group —$CH_2$—O-Phe-. Generally, the side chain will be attached to an ethylene moiety forming part of the backbone of the polymer. Preferred polymers include polystyrene. The polymer is useful as a support for solid phase chemical reactions especially combinatorial chemical synthesis.

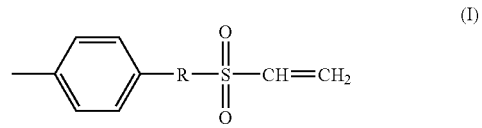

(I)

11 Claims, No Drawings

VINYL SULPHONE MODIFIED POLYMER

This is a divisional of U.S. application Ser. No. 09/485,195, filed May 4, 2000, now abandoned, which is a 371 of PCT/GB98/02264, filed Aug. 5, 1998.

The present invention concerns the preparation and use of chemically functionalised polymeric resins for use in solid-phase chemical synthesis.

Recent trends in the area of drug development, biotechnology and chemical research have moved towards producing large arrays of related molecules using combinatorial or permutational synthesis. These relatively new techniques are potentially capable of yielding libraries of millions of compounds which can be screened, if a suitable assay is available, to identify the required chemical, physical or biological property, eg biological activity. The new methods offer advantage because only a relatively small number of chemical reaction vessels need to be used, compared to the traditional methods in which a single compound is sequentially processed through various chemical transformations, usually one reaction step at a time. The new method, combinatorial synthesis, relies on the fact that under suitable conditions and in the presence of a single reagent or set of reagents, several to very many compounds can be converted simultaneously into several to very many new products using a single reaction vessel.

The problems with combinatorial chemistry are manifold. First, the reaction chemistry needs to be irreversible, such that each of the starting materials in the mixture is converted to a new product in good yield. Second, at the present time it is most feasible to perform combinatorial chemistry in the "solid-phase", this is where the starting materials are covalently bonded to a polymeric support, usually cross-linked polystyrene. The advantages of solid-phase synthesis are that the products do not need to be purified by, for example, solvent extraction, distillation, recrystallisation or chromatography but rather are retained on the solid medium by washing away the excess reagents and impurities. Thus, in solid-phase synthesis it is necessary to confine the polymeric support so that it too is not washed away. The third problem concerns the deconvolution of the library which essentially requires identifying the chemical structure of the molecule, within the mixture, that shows the required biological activity or other desired property. Clearly, when one is dealing with mixtures of compounds, where the polymeric support for one compound looks identical to that for another, one requires the resynthesis of partial libraries of ever decreasing size, coupled with assay, in order to identify the active material. This method of deconvolution is time consuming and unnecessarily clumsy. Another way of effecting deconvolution is to tag the polymeric support with chemicals which can be used to decode the synthetic chemical history of the particular particle of polymeric support, independently to being able to carry out an activity assay on the material attached to the support. Such methods have been described in the literature. Since typical particles of polymeric support are referred to as "resin beads" and are commercially available in the size 70–400 microns, deconvolution by such methods is a fiddly job requiring accurate and expensive instrumentation.

The fourth problem concerns checking the efficiency of the chemical synthesis and, in essence, this is a problem of scale. Individual beads possess, at most, only a few to several nanomoles of material attached to them and, therefore, it is extremely difficult to check either the efficiency of the synthesis or the purity of the synthetic product. In highly sensitive biological screening assays this can be a very serious problem as the impurity could be responsible for a positive result. The best way to overcome this last problem is to perform syntheses on a larger scale such that some material can be put aside for characterisation and analysis. While this solution offers very many advantages, the practice of a larger scale combinatorial syntheses requires the design and use of microreactors or other small individual reaction chambers into which larger quantities of resin material can be confined.

Small individual reaction chambers may be open or closable flasks, tubes, 'pins', wells and other types of standard laboratory apparatus. Microreactors may be designed to contain resin beads within a porous enclosure which is pervious to reagent solutions and solvents.

Several reports on the use of microreactors for solid-phase syntheses on a polymeric support, in which the resin beads are enclosed within the microreactor, have been described and include microreactors constructed from polypropylene, which is not inert and mircroreactors construed from almost totally inert frit glass and polytetrafluoroethylene. Other authors supplied little information on the design of the microreactors or on how they were used in synthesising libraries of compounds. The main purpose of the reports was to describe the incorporation of an addressable microchip into the microreactors which could be written to and read using radio waves. This elegant idea does require the microreactors to be of a size large enough to contain the addressable chip and also demands the use of sophisticated and moderately expensive equipment.

The design and construction of visually addressable microreactors for use in combinatorial chemical synthesis is described in WO-A-97/30784. This publication describes vessel designs suitable for use with a whole range of different types of chemical environment (due to the inertness of the microreactors) and suitable for use with a whole range of different types sizes and numbers of addressable microreactors. The system was optimised for use with POSAM® (Permutational Organic Synthesis in Addressable Microreactors) where microreactor identification is performed visually, but is also suitable for use with radio-addressable microreactors or any other type of microreactor tagging system or solid support tagging system or hybrid tagging system including those which utilise laser or mass spectrometric or radioisotope or magnetic resonance or any other spectroscopic or fluorimetric or related methodology which uses electromagnetic radiation to detect the identity of, or communicate with, the microreactor.

The stability of our previously described POSAM® microreactors to the very wide range of reaction conditions employed in conventional organic synthesis is such that, in theory, almost every common synthetic protocol described to date in the chemical literature could be performed in the microreactor where all the reagents are solutions, liquids or gases and can reach the resin bound substrates (ie the entities which are being processed by the exposure to the reagents). Obviously heterogeneous reagents and other particulate matter above a certain size can not pass through the walls of the frit glass microreactors, and also reagents which dissolve glass (hydrofluoric acid) or react with PTFE (solvated electrons) are far from ideal. Nevertheless, there is an enormous practical potential for the use of POSAM® microreactors in chemical synthesis which is currently limited by:

a) the stability of the polymer-base support used in the commercially available resin materials that are currently employed for solid-phase chemical synthesis, b) the range of functional groups available in commercial resin materials. (For a comprehensive list examples of available resin materials, see the 1997 Nova solid-phase synthesis Catalogue).

These two issues are not unrelated because some functional groups would require such demanding conditions to work with that the resin polymer base would be destroyed under the required conditions.

The polymer base for almost all of the commercially available resin materials, whether modified with polyethylene glycol appendages to give Tentagel resins or otherwise, is 1–2% divinylbenzene cross-linked polystyrene in which approximately one in ten of the phenyl rings derived from the styrene is modified to give a benzyl moiety to which different functional groups are attached. The chloromethyl (or benzyl chloride) derivative is called Merrifield resin and this material and its derivatives are mechanically fragile and swell several fold in most organic solvents (eg dimethylformamide, tetrahydrofuran, dichloromethane) but not all organic solvents (eg methanol). The reaction kinetics for chemical reactions performed on polystyrene-based resins is drastically effected by how swollen the resin becomes as it is solvated by the particular organic solvent. Polystyrene is also chemically sensitive to some hot organic solvents and is modified by solutions of the very strong nucleophiles/bases and the protic and Lewis acids commonly used in conventional synthesis.

Other polymer supports have found uses in biochemical applications such as the preparation of affinity columns for isolating and/or binding to proteins, DNA, RNA etc. These systems are usually used in aqueous buffer solutions and the polymer support is usually derived from polysaccharide, polyamide, polyacrylate or polyacrylamide solid phases. These are, in general, unsuitable for organic synthesis.

The present invention seeks to overcome disadvantages associated with present practices in solid-phase synthesis by providing new functional groups, to allow a wider range of chemical manipulations and reactions to be performed in solid-phase synthesis. The synthetic steps could be performed in open vessels, for example in standard laboratory flasks, in closed vessels, for example in chromatography columns, or, in microreactors where the resin material is contained within a porous container. In particular, this invention concerns the limitations of stability to bases and nucleophiles in the acrylate ester REM resin system that has been published in the literature.

Specifically, the present invention provides a resin modified by vinyl sulphone moieties which support the same chemical reactivities as for the REM resin system and also serve as an "traceless linker" system, whilst offering greater stability towards nucleophiles and bases and in particular towards unstabilised carbanions such as Grignard agents.

A summary of the REM system is given in Formula A below, whilst the vinyl sulphone system of the present invention is shown in Formula B.

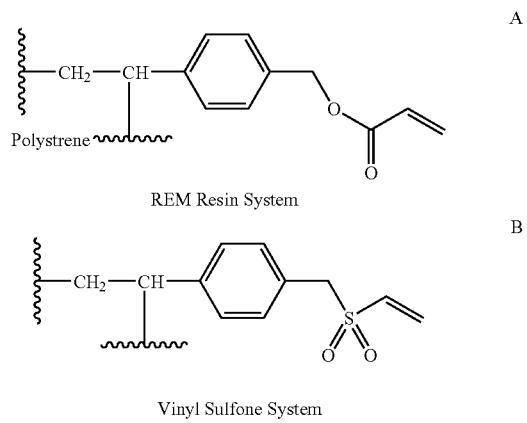

The present invention provides an polymer having a side chain of general formula (I)

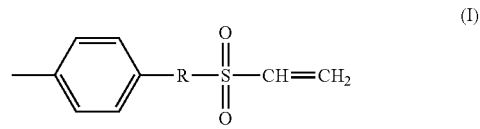

where R is an alkyl, aryl, oxyalkyl or oxyaryl linker group or any similar group.

Generally the side chain will be attached to an ethylene moiety forming part of the backbone of the polymer.

The _CH$_2$—CH_ group is an ethylene grouping which is part of a resin backbone. Preferred resins include polystyrene.

The resin has increased stability in the presence of nucleophiles and/or bases.

The resin particularly offers increased stability towards unstabilised carbanions, for example, Grignard reagents.

The vinyl group of the vinyl sulphone moiety may be reacted with chosen reactants to provide resin-bound compounds. Thus, the modified polymer is useful as a support (resin) for solid phase chemical reactions, especially combinatorial chemical synthesis.

The resin may be regenerated by the removal of the resin-bound compounds by use of suitable reactants.

Suitably, where R is an alkyl or oxyalkyl moiety R is preferably a $C_{1-10}$ and may be branched or linear and where R is an aryl or oxyaryl moiety, R is preferably a benzene ring or a group $CH_2$—O-Phe-.

In one embodiment of the present invention, the modified ethylene hydrocarbon polymer is a benzyl vinyl sulphone polymer as represented by formula (II) in which R is a —CH$_2$— group:

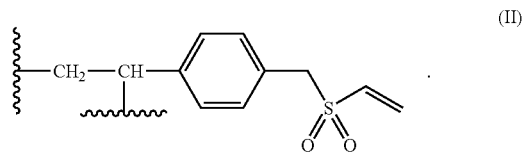

In a further embodiment of the present invention, the modified ethylene hydrocarbon polymer is a benzyloxyaryl vinyl sulphone as represented by formula (III):

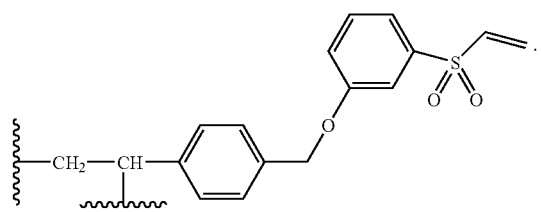

(III)

The resin can be used in reactions involving liquid and gas phase reactants.

Suitably, the resin is used for traceless reactions.

The resin has particular utility in solid-state combinatorial chemical reactions.

Also provided by the present invention is a method for producing the resin wherein a Merrifield resin is modified to provide the resin of the present invention; for example but not limited to, the chlorine of the methylene group of the Merrifield resin is substituted to provide the resin of the present invention.

The present invention provides the use of the resin defined above in the form of a porous structure as a support for chemical reactions.

The present invention will now be further described with reference to the following, non-limiting, examples.

EXAMPLE 1

Synthesis of Polymer Having a Side Chain of Formula II

With reference to the synthesis of the vinyl sulphone system, a preferred process includes the steps summarised in Scheme 1 below in which Merrifield resin (1) was reacted with 2-hydroxyethylthiol ether as its sodium or caesium salt or as the free acid to give the thioether (2) which was subsequently oxidised with ozone or, preferably, m-chloroperoxybenzoic acid, to give the 2-hydroxyethylsulfone derivative (3). Each resin derivative showed the correct analytical data and displayed the expected spectral properties.

Treatment of the resin (3) with phosphorous tribromide gave activated resin (4, X=Br) and then, after washing with dimethylformamide, treatment of this activated resin with a tertiary amine, for example, diisopropylethylamine (DIPEA), gave the resin bound polymer-benzyl vinyl sulfone (5). The same material (5) was obtained by treating resin (2) with methane sulfonyl chloride in the presence of triethylamine, to give the mesyl activated ester (4, X=OMs) which underwent 1,2-elimination to give (5).

Scheme 1.

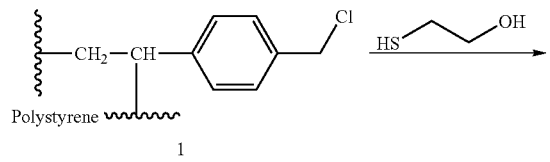

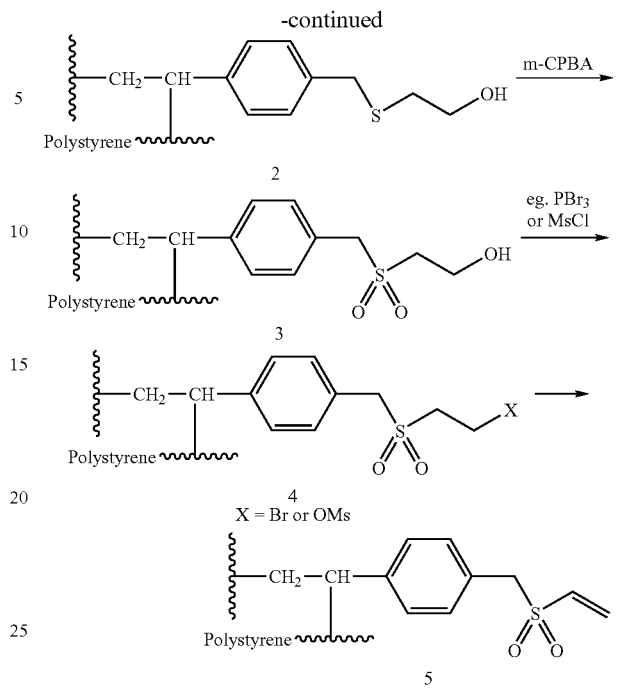

Polymer-benzyl vinyl sulfone (5) could be either trapped in situ or, be reacted separately, after isolation, with a range of primary and secondary amines. For example, reaction of secondary amine tetrahydroisoquinoline (THIQ) for 8 hours at 25° C. with resin derivative (5) gave the resin bound tertiary amine (6) which displayed the expected mass increase, see Scheme 2. Similarly, dioctylamine, benzylamine, piperidine and pyrrolidine and/or their derivatives gave the expected products which were characterised as their alkylated derivatives as described below.

Treatment of resin bound teriary amines such as (6) with alkylating agents such as methyl iodide, benzyl bromide or allyl bromide either at room temperature or at higher temperatures gave the N-alkylated quaternary ammonium salt derivatives (7). These could be cleaved from the resin very conveniently by treatment of the quaternary ammonium salt derivative with a mild base, for example a teriary amine such as triethylamine or DIPEA, to give the required product, a new tertiary amine (8) (as its salt) and to simultaneously regenerate the resin bound polymer-benzyl vinyl sulfone (5). In one instance, for example, the tertiary THIQ amine derivative (6a) was formed from (5) and was alkylated with allyl bromide to give the quartenary ammonium salt (7a; R, $R^1$=THIQ, $R^2$=allyl), which was treated with DIPEA, to give N-allyltetrahydroisoquinoline initially as its salt, see Scheme 2 below.

Scheme 2.

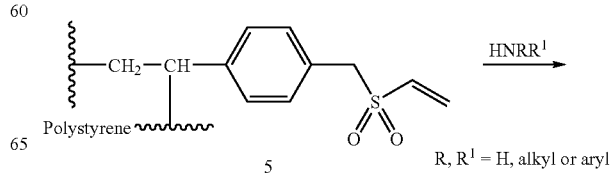

R, $R^1$ = H, alkyl or aryl

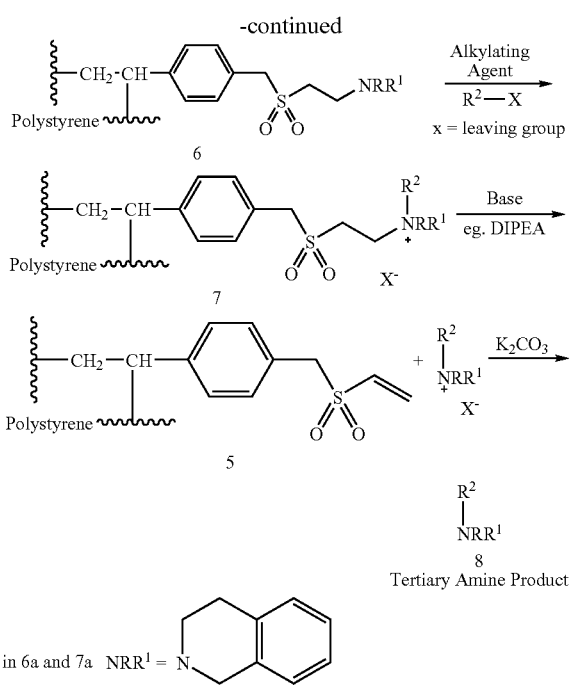

(cf. 6) or the construction of a tertiary amine by the Michael addition of a primary amine, followed by alkylation in the solid phase, is similar to that which occurs in the so called REM resin system which has been published in the literature. The REM system has a CH$_2$CHC=O (acrylate) ester group in place of the vinyl sulfone of this new system (5). Furthermore, the alkylation of the resin bound tertiary amines followed by base-catalysed 1,2-elimination (ie, steps analogous to those for converting 6 to 7 and 7 to 5 in Scheme 2) have also been published in the literature for the REM resin system.

Note that for the REM resin system the entire sequence is analogous to the reported mechanism of action of the enzyme methyl aspartase and related enzymes.

EXAMPLE 2

Synthesis of Polymer Having a Side Chain of Formula III

In a second embodiment of the invention, a Merrifield derivative of the aryl sulphone system analogous to resin (5), resin (9), was also prepared by reacting 3-(N,N-dialkyl-2-aminoethylsulfonyl)-phenol (10) with activated hydroxymethylpolystyrene resin (11) under Mitsunobu conditions, and then alkylating and eliminating the dialkylamino moiety, see Scheme 3, using similar chemistry to that depicted in Scheme 2. This gave a polymer benzyloxyaryl vinyl sulfone (9).

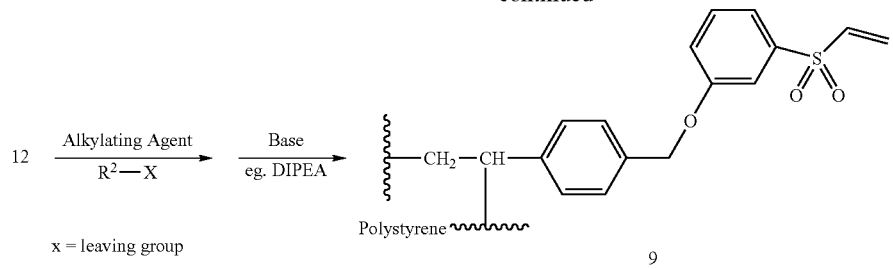

The resin also displayed all of the useful chemical properties of REM resin, as for resin (5).

EXAMPLE 3

Solid Phase Reactive Using Vinyl Sulphone Polymers as Solid-Phase Support

When tested in direct comparison with the REM resin system, both of the vinyl sulfone systems (5) and (9) showed very considerable advantages in stability in the presence of nucleophiles and bases. Indeed, it was possible to synthesise tertiary alcohols, for example, compounds (13) and (14) using the very demanding conditions of the Grignard reagents MeMgBr and PhMgBr.

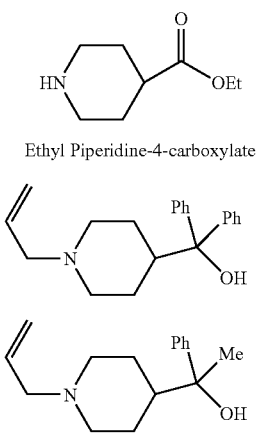

For these examples ethyl 4-piperidinecarboxylate (E4PC) or the corresponding methyl ketone were first reacted with each of the vinyl sulphone resins to give the resin bound tertiary amines (eg 6, NRR'=E4PC) then these were treated with the Grignard reagent PhMgBr to give the alcohols. The cleavage of these alcohols from the resin was effected using allyl bromide DIPEA as outlined in Scheme 2. Under these conditions REM resin was completely decomposed by the Grignard reagents.

As was predicted, other addition reactions to the resin bound vinyl sulphones using non-nitrogen nucleophiles were also possible. For example, diethyl malonate, nitromethane and thiophenol reacted. Also, as predicted on the basis of solution phase chemistry, the resin bound vinyl sulphones (5) and/or (9), underwent Diels-Alder reactions and other electrocyclic reactions in the presence of dienes and/or 1,3-dipoles.

The range of addition and electrocyclic reactions in which the resins (5) and (9) and other resin bound vinyl sulphones could take part in is infinite. Therefore, within the spread of this invention in any resin bound vinyl sulphones moiety, whether supported on polymers or any similar substitute ethylene hydrocarbon polymer, in glass or silica or carbon fibre, however linked to the support in any synthetic addition reaction or electrocyclic reaction, should be considered as forming part of the invention described herein.

EXAMPLE 4

Experimental Procedures for the use of Vinyl Sulfone Chemistry on Polystyrene Resins Elemental microanalyses were performed in the departmental microanalytical laboratory of the University of St Andrews.

NMR spectra were recorded on a Bruker AM-300 (300 MHz; f.t. $^1$H-NMR, and 74.76 MHz $^{13}$C-NMR). Varian gemini 200 (200 MHz; f.t. $^1$H-NMR and 50.31 MHz; $^{13}$C-NMR). $^1$H-NMR and $^{13}$C-NMR spectra are described in parts per million downfield from TMS and are reported consecutively as position (δH or δC), multiplicity (s-singlet, d-doublet, t-triplet, q-quartet, dd-doublet of doublets, ddt-doublet of doublets of triplets, m-multiplet and br-broad), relative integral, coupling constant (Hz) and assignment. $^1$H-NMR are referenced internally on $CHCl_3$ (7.25 ppm) or DMSO (2.47 ppm). $^{13}$C-NMR are referenced on $CHCl_3$ (77.0 ppm), or DMSO (39.7 ppm).

IR spectra are recorded on a Perkin-Elmer 1710 f.t. IR spectrometer. The samples were prepared as thin films between sodium chloride discs or KBr disks (2%). The frequencies (v) as absorption maxima are given in wavenumbers ($cm^{-1}$) relative to a polystyrene standard. Intensities are reported as broad-br, strongest, very strong-vst, medium-m, weak-w. Mass spectra and accurate mass measurements are recorded on VF 70–250 SE. Ma or fragments using the ionisation method indicated are given as percentages of the base peak intensity (100%).

Abbreviations: DMSO, dimethylsulfoxide; DMF, dimethylformamide; DCM, dichloromethane: THIQ, tetrahydroisoquinoline; THF, tetrahydrofuran; mCPBA, meta-chloroperoxybenzoic acid (Aldrich, 85%); DIPEA, diisopropylethylamine; DEAD, diethylazodicarxobylate; DIAD diisopropylazodicarbobylate; PE, petroleum ether (fraction b.p. 40–60° C.); est., estimate; max.est.yield, maximal estimated yield; Ⓟ, polystyrene.

2-Hydroxyethyl-thiomethyl-polystyrene 1

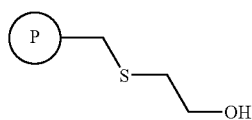

Method A: Merrifield resin (Novabiochem, 0.76 mmol g$^{-1}$, 5 g, 3.8 mmol) was suspended in dry DMF (40 cm$^3$) and a solution of sodium 2-hydroxyethanethiolate, freshly prepared from NaH (12.5 mmol, 500 mg, 60% in mineral oil) and 2-hydroxyethanethiol (12.8 mmol, 0.9 cm$^3$) in DMF (25 cm$^3$), was added. The suspension was stirred at 60° C. for 4 h then at 90° C. for 1 h and then overnight at 20° C. The resin was removed by filtration, washed successively with DMF, DCM, H$_2$O, DCM, MeOH/H$_2$O, DCM/DMF and with MeOH (50 cm$^3$, each of them). The resin was dried under high vacuum with warming to 50° C. Yield of resin 5.17 g.

IR ($\upsilon_{max}$/cm$^{-1}$, 2% in KBr): 3500 (st), 3462 (br, OH), 1601, 1493, 1452 (st, polystyrene), 1059 (m), 1025(m). Sulfur analysis of 1: ~2.27% (max. est. yield: 2.24%)

Method B: Merrifield resin (Novabiochem, 0.76 mmol g$^{-1}$, 3.8 g, 2.9 mmol) in dry DMF (20 cm$^3$) was treated with 2-hydroxyethanethiol (15.25 mmol, 1 cm$^3$), K$_2$CO$_3$ (14.5 mmol, 2 g) and pyridine (12.9 mmol, 1 cm$^3$). The suspension was stirred for 4 h at 95° C. It was left over night at 20° C. The resin was filtered off and washed extensively with DMF, DCM, H$_2$O, H$_2$O/MeOH (1:1) and then pure MeOH and finally dried under vacuum at 50° C. to give 3.92 g of material.

IR ($\upsilon_{max}$/cm$^{-1}$, 2% in KBr): 3450 (br, OH), 1601, 1493, 1453 (st, polystyrene), 1060 (m), 1027 (m). Sulfur analysis: ~2.12% (max: est. yield: 2.24%)

Method C: Merrifield resin (Novabiochem, 0.76 mmol g$^{-1}$1.96 g, 1.45 mmol) in dry DMF (50 cm$^3$) was treated with Cs$_2$CO$_3$ (2.98 mmol, 0.971 g) and 2-hydroxyethanethiol (14.96 mmol, 1.045 cm$^3$). After stirring for 2 d at 20° C. the resin was drained and washed like in the cases A and B and dried at 45° C. under high vacuum. Yield: 1.86 g of resin.

IR ($\upsilon_{max}$/cm$^{-1}$, 2% in KBr): 3425 (br, OH), 1601, 1493, 1453 (st, polystyrene). 1061 (m), 1029 (m).

2-Hydroxyethyl-sulfomethyl-polystyrene 2

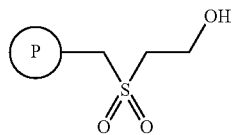

Resin 1 (0.7 mmol g$^{-1}$ (est.), 1.5 g) were treated with mCPBA (5.2 mmol, 1.05 g). The suspension warmed up to 35° C. for a short period of time and was stirred at 20° C. for 2 d. After filtration the resin was washed with large quantities of MeOH, DCM, H$_2$O and MeOH, and dried at 50° C. under high vacuum. Yield: 1.51 g IR ($\upsilon_{max}$/cm$^{-1}$, 2% in KBr): 3511 (br, OH), 1601, 1493, 1453 (st, polystyrene), 1317, 1119 (st, SO$_2$), 1061 (m), 1029 (m). Sulfur analysis: ~2.76% (max. est. yield: 2.19%)

Vinylsulfomethylpolystyrene 3 and N-allyl tetrahydroisoquinoline HBr 4

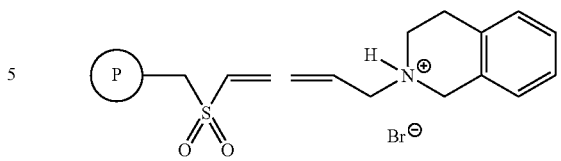

Method A: resin 2 (0.65 mmol g$^{-1}$ (est.), 1.49 g) in dry DCM (25 cm$^3$) were treated with PBr$_3$ (2.28 mmol, 216 mm$^3$) at 20° C. for 12 h. The resin was filtered off, washed with DCM (200 cm$^3$), dried at air and transferred to a flask with DMF (20 cm$^3$) and THIQ (5.7 mmol, 725 mm$^3$) was added. The resin was stirred at r.t. for 24 h, washed with DMF, MeOH, DCM, and MeOH. It was dried under high vacuum. 1.45 g (0.5 mmol g$^{-1}$ (est.)) of it was resuspended in DMF (10 cm$^3$) and allyl bromide (150 mm$^3$, 1.7 mmol) was added. After 5 d at 20° C. the solid was filtered off, washed with DMF (100 cm$^3$) and DCM (100 cm$^3$). The resin was then treated with DIPEA (1.00 mmol, 175 mm$^3$) in DCM (25 cm$^3$). After 2 days the solid material was filtered off and washed with DCM and MeOH. Yield of resin 3 1.28 g (max. est. yield: 1.25 g). The solvent was removed from the filtrate and gave analytical pure 4 (0.47 mmol, 120 mg, 59%) as a white solid.

3: IR ($\upsilon_{max}$/cm$^{-1}$, 2% in KBr); 1727 (m), 1600, 1491, 1450 (st, polystyrene), 1320, 1119 (st, SO$_2$). 4: $^1$H-NMR (δ/ppm, 300 MHz, CDCl$_3$): 12 (s, br, 1H, HBr), 7.30–7.08 (m, 4H, aromatics), 6.33 (ddt, 1H, J$^{cis}$=10.0 Hz, J$^{trans}$=17.15 Hz, $^3$J=7.14 Hz, CH$_2$—CH=CH$_2$), 5.61–5.5 (m, 2H, CH$_2$—CH=CH$_2$), 4.35 (br m, 2H, N—CH$_2$-Ph), 3.76 (d, 2H, $^3$J=7.14 Hz, CH$_2$—CH=CH$_2$), 3.42 (br m, 4H, N—CH$_2$—CH$_2$-Ph).

$^{13}$C-NMR (δ/ppm, 74.76 MHz, CDCl$_3$): 130.54, 129.13 ($^2$C, $^7$C), 128.78, 127.74, 127.05, 126.44, 126.38, 126.25 (remaining aromatics and double bond), 57.53 (N—CH$_2$-Ph), 51.43 (N—CH$_2$—CH=CH$_2$), 48.33 N—CH$_2$—CH$_2$-Ph), 24.22 (N—CH$_2$—CH$_2$-Ph). Found C, 56.57; H. 6.57; N, 5.42%. C$_{12}$H$_{16}$BrN requires C, 56.71; H, 6.34; N, 5.51%. m/z (CI) 174 (M$^+$–Br$^-$, 100%).

Method B: 2 (0.6 mmol g$^{-1}$ (est.), 0.57 g) in dry DCM (30 cm$^3$) was treated with triethylamine (3.4 mmol, 4.78 mm$^3$) followed by mesyl chloride (1.72 mmol, 133 mm$^3$) at 20° C. With addition the suspension became yellow and warms up slightly. It was stirred at ambient temperature for 12 h and the resin was filtered off, washed with DCM (200 cm$^3$) and transferred into a sintered plastic tube with DMF (7 cm$^3$). In the presents of THIQ (1.7 mmol, 216 mm$^3$) the resin was agitated for 8 h, washed again with DMF and treated with allyl bromide (3.4 mmol, 300 mm$^3$) in DMF (9 cm$^3$). After 14 h at 20° C. the polymere was washed with DMF, MeOH and DCM. DIPEA (3.4 mmol, 600 mm$^3$) in DCM (7 cm$^3$) was added to the resin. After 12 h agitation the resin was washed with DCM and MeOH like under A and the solvent removed from the combined filtrates. The resin was dried at 50° C. in an oven under vacuum. Yield of resin 3 0.55 g (max. est. yield: 0.51 g).

The amine 4 was liberated from its HBr salt with K$_2$CO$_3$ solution (2M, 10 cm$^3$) extracted into EtOAc. The organic layer dried over K$_2$CO$_3$, filtered and the solvent removed. Yield of pure 4: 0.23 mmol, 40 mg, 68%.

3: IR ($\upsilon_{max}$/cm$^{-1}$, 2% in KBr): 1727 (m), 1600, 1491, 1449 (st, polystyrene), 1313, 1117 (st, SO$_2$), 1026 (m). 4: $^1$H-NMR (δ/ppm, 300 MHz, CDCl$_3$): 7.14–7.01 (m, 4H, aromatics), 5.96 (ddt, 1H, J$^{cis}$=9.9 Hz, J$^{trans}$=17.15 Hz, $^3J$=6.6 Hz, CH$_2$—CH=CH$_2$), 5.3–5.18 (m, 2H, CH$_2$—CH=CH$_2$), 3.63 (s, 2H, N—CH$_2$-Ph), 3.18 (dt, 2H, $^3J$=6.5 Hz, $^4J$=1.37 Hz, CH$_2$—CH=CH$_2$), 2.92 (t, 2H, $^3J$=5.8 Hz, N—CH$_2$—CH$_2$-Ph), 2.75 (t, 2H, $^3J$=5.8 Hz, N—CH$_2$—CH$_2$-Ph). $^{13}$C-NMR (δ/ppm, 74.4 MHz, CDCl$_3$): 135.28 (N—CH$_2$—CH=CH$_2$) (134.72, 134.26 (ipso carbons), 128.74, 126.64, 126.20, 125.65 (remaining aromatics), 118.03 (N—CH$_2$—CH=CH$_2$) 61.37 (N—CH$_2$-Ph), 55.88 (N—CH$_2$—CH=CH$_2$), 50.49 (N—CH$_2$—CH$_2$-Ph), 28.90 (N—CH$_2$—CH$_2$-Ph).

3-Methoxy-1-(2'-chloroethyl)thiophenol 5

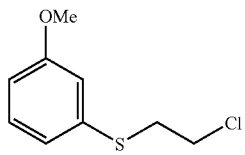

N-Chlorosuccinimide (25.9 mmol, 2.86 g) was suspended in dry DCM (50 cm$^3$). Slowly, 3-methoxythiophenol (25 mmol, 3.1 cm$^3$) was added. After addition of 1 cm$^3$ the suspension turned orange and warmed up. It was cooled for one minute with water and the remaining thiol was added in one go. The orange solution became clear and after 15 minutes a precipitate of succinimide drops out of the solution. After additional 15 minutes of stirring at 20° C. the flask was filled with ethene. The suspension turned almost colourless, the solvent was removed and the residue stirred in carbon tetrachloride (50 cm$^3$). Filtration and removal of the solvent gave crude 5 which was used in the following reaction. Crude yield of 5: 24.3 mmol, 4.93 g, 97%.

5: $^1$H-NMR (δ/ppm, 200 MHz, CDCl$_3$): 7.29–7.21 (m, 1H, aromatic), 7.12–6.94 (m, 2H, aromatics), 6.93–6.75 (m, 1H, aromatics), 3.83 (s, 3H, OMe), 3.77–3.59 (m, 2H, —S—CH$_2$), 3.28–3.19 (m, 2H, Cl—CH$_2$).

3-Methoxy-1-(2'-chloroethyl)phenylsulfone 6

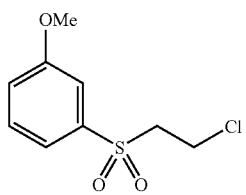

Crude 5 (24.2 mmol, 4.90 g) were dissolved in DCM (80 cm$^3$) cooled to 0° C. and mCPBA (48 mmol, 9.7) were added in portions. The reaction was stirred over night and again treated with mCPBA (24.6 mmol, 5 g) in additional DCM (100 cm$^3$). Ether (100 cm$^3$) was used to dilute the suspension after 24 h and the organic layer was washed thoroughly with Na$_2$CO$_3$ solution (5%, 100 cm$^3$). Three washings with Na$_2$CO$_3$ (5%), brine and drying over MgSO$_4$ followed. Yield of pure 6: 15.3 mmol, 3.58 g, 63%, mp: 50.3° C.

6: $^1$H-NMR (δ/ppm, 200 MHz, CDCl$_3$): 7.52–7.35 (m, 3H, aromatics), 7.26–7.22 (m, 1H, aromatic), 3.89 (s, 3H, OMe), 3.80–3.72 (m, 2H, —SO$_2$—CH$_2$), 3.57–3.49 (m, 2H, Cl—CH$_2$). $^{13}$C-NMR (δ/ppm, 74.76 MHz, CDCl$_3$): 160.42 (=COMe), 139.82 (=CSO$_2$), 130.83 (C$^5$), 120.87 (C$^4$), 120.33 (C$^6$), 112.65 (C$^2$), 58.02 (SO$_2$—CH$_2$), 55.81 (OCH$_3$), 35.57 (CH$_2$—Cl). IR ($υ_{max}$/cm$^{-1}$, film): 1310, 1146 (st, SO$_2$), 1251, 1034 (Ph-O-Me). Found C, 46.26%; H, 4.43%. C$_9$H$_{11}$ClO$_3$S requires C, 46.06; H, 4.72%. m/z (CIHRMS) 235.020144 (M$^+$+H, C$_9$H$_{12}$ClO$_3$S requires 235.019569, 100%).

3-Hydroxy-1-(2'-chloroethyl)phenylsulfone 7

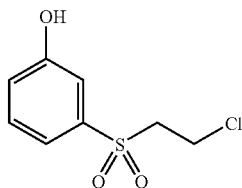

To 6 (8.95 mmol, 2.1 g) in dry DCM (50 cm$^3$) was added 1M BBr$_3$ (27 mmol, 27 cm$^3$) in DCM at 0° C. The solution was allowed to reach 20° C. over night, poured into ice water (100 cm$^3$) and stirred for 1.5 h. The aqueous layer was saturated with NaCl and extracted with DCM. The combined organic layers were dried over MgSO$_4$. Filtration and removal of the solvent gave 7 as a white solid (7.8 mmol, 1.72 g, 87%). An analytical sample was obtained by recrystallisation from DCM (mp: 107.6° C.).

7: $^1$H-NMR (δ/ppm, 300 MHz, CDCl$_3$): 7.51–7.41 (m, 3H, aromatics), 7.26–7.15 (m, 1H, aromatic), 6.10 (br s, 1H, OH), 3.77–3.72 (m, 2H, —SO$_2$—CH$_2$), 3.57–3.51 (m, 2H, Cl—CH$_2$). $^{13}$C-NMR (δ/ppm, 50.31 MHz, CDCl$_3$/(D$_6$) DMSO): 158.05 (=COH), 138.77 (=CSO$_2$), 130.18 (C$^5$), 121.40 (C$^4$), 118.04 (C$^6$), 114.26 (C$^2$), 57.39 (SO$_2$—CH$_2$), 35.29 (CH$_2$—Cl). IR ($υ_{max}$/cm$^{-1}$, film): 3390 (s, OH), 1304, 1148 (st, SO$_2$). Found C, 43.39; H, 3.78%. C$_8$H$_9$ClO$_3$S requires C, 43.54; H, 4.11%.

m/z (CIHRMS) 221.004546 (M$^+$+H, C$_8$H$_{10}$ClO$_3$S requires 221.003919, 100%).

3-Hydroxy-1-phenylvinylsulfone 8

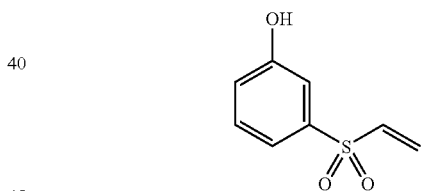

7 (7.3 mmol, 1.6 g) suspended in DCM (50 cm$^3$) was slowly treated with DBU (10.9 mmol, 1.63 cm$^3$) at 0° C. After 10 minutes a second portion of DBU (3.3 mmol, 0.5 cm$^3$) was added and the solution allowed to stir at 20° C. for 1.5 h. It was then poured into 2% HCl (18 cm$^3$) and Et$_2$O (150 cm$^3$) was added. The organic layer was washed with 1M HCl (2×10 cm$^3$) and brine, and dried over MgSO$_4$. After filtration and removal of the solvent the product was taken up in DCM and two spoonful of charcoal was added to the yellow solution. It was filtered through a plug of silica, prewashed with PE/EtOAc (1:1). The filtrate was evaporated and gave under high vacuum a colourless solid. Yield of 8: 6.25 mmol, 1.15 g, 86%, mp: 58–60° C.

8: $^1$H-NMR (δ/ppm, 300 MHz, CDCl$_3$): 7.46–7.39 (m, 3H, aromatics), 7.16–7.11 (m, 1H, aromatic), 6.67 (dd, 1H, $^{trans}J$=16.5 Hz, $^{cis}J$=9.89 Hz, H$^{gem}$) 6.64 (d, 1H, $^{trans}J$=16.5 Hz, H$^{cis}$), 6.55 (s, 1H, OH), 6.07 (d, 1H, $^{cis}J$=9.89 Hz, H$^{trans}$). $^{13}$C-NMR (δ/ppm, 50.31 MHz, CDCl$_3$): 157.53 (=COH), 140.22 (=CSO$_2$), 138.24 (SO$_2$—CH=CH$_2$), 131.38 (C$^5$), 128.98 (SO$_2$—CH=CH$_2$), 122.06 (C$^4$), 120.01 (C$^6$), 114.87 (C$^2$). IR ($υ_{max}$/cm$^{-1}$, film):

3391 (st, OH), 1301, 1138 (st, SO$_2$). Found C, 51.94; H, 4.40. C$_8$H$_8$O$_3$S requires C, 52.16; H, 4.38%. m/z (EIHRMS) 184.019781 (M$^+$, C$_8$H$_8$O$_3$S requires 184.019416, 100%).

3-Hydroxy-1-(2'-[N-tetrahydroisoquinoline]ethyl)phenylsulfone 9

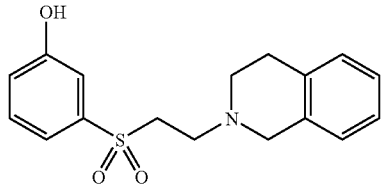

8 (5.43 mmol, 1 g) in DCM (25 cm$^3$) was treated dropwise with THIQ (6.25 mmol, 797 mm$^3$) at room temperature. After 12 h precipitated 9 was filtered off as a white solid, washed with PE, and dried under high vacuum. Yield of 9: 5 mmol, 1.58 g, 92%, mp: 177.0° C.

9: $^1$H-NMR (δ/ppm, 300 MHz, (D$_6$)DMSO): 10.17 (s, 1H, OH), 7.43–7.25 (m, 3H, aromatics), 7.08–6.93 (m, 5H, aromatics), 3.55 (t (br), 2H, $^3$J=7.14 Hz, —SO$_2$—CH$_2$), 3.48 (s, 2H, N—CH$_2$-Ph), 2.73 (t (br), 2H, $^3$J=7.40 Hz, —SO$_2$—CH$_2$—CH$_2$—N), 2.66–2.55 (m (br), 4H, N—CH$_2$—CH$_2$-Ph). $^{13}$C-NMR (δ/ppm, 74.76 MHz, (D$_6$)DMSO): 158.44 (=COH), 141.13 (=CSO$_2$), 135.03/134.41 (C$^{2'}$/C$^{6'}$, THIQ), 131.11 (C$^5$), 129.92 (C$^4$, THIQ), 126.84 (C$^5$, THIQ), 126.51 (C$^6$, THIQ), 121.20 (C$^4$), 120.0 (C$^3$, THIQ), 118.56 (C$^6$), 114.47 (C$^2$), 55.28 (SO$_2$—CH$_2$), 52.79 (N—CH$_2$-Ph), 51.17 (—SO$_2$—CH$_2$—CH$_2$—N), 50.31 (N—CH$_2$—CH$_2$-Ph), 28.87 (N—CH$_2$—CH$_2$-Ph). IR (υ$_{max}$/cm$^{-1}$, film): 3441 (st, OH), 1304, 1140 (st, SO$_2$). Found C, 64.11; H, 6.19; N, 4.35. C$_{17}$H$_{19}$O$_3$NS requires C, 64.33; H, 6.03; N, 4.41%. m/z (CIHRMS) 317.109012 (M$^+$, C$_{17}$H$_{19}$O$_3$NS requires 317.108565, 100%).

Methylene-3-oxy-1-(2'-chloroethyl)phenylsulfone polystyrene 10

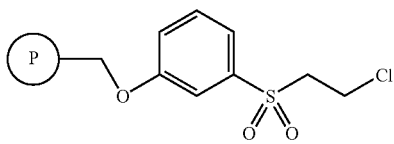

To dry hydroxymethyl polystyrene resin (1.16 mmol g$^{-1}$, 431 mg) suspended in DCM/THF (1:1; 33 cm$^3$), DEAD (2 mmol, 315 mm$^3$) and 7 (4 mmol, 880 mg) were added. Triphenylphosphine (2 mmol, 524 mg) was added slowly, and the cleared suspension was stirred at 20° C. After 3 h the resin was filtered off and washings with DCM/THF (1:1; 3×30 cm$^3$), DCM (3×30 cm$^3$), iPrOH (3×30 cm$^3$) and MeOH followed. The resin was dried at 45° C. under vacuum. Yield 554 mg (max. est. yield: 550 mg).

The filtrate evaporated and chromatographed on silica (PE/EtOAc; 3:2) gave 7 (460 mg, 2.08 mmol) and 8 (129 mg, 0.7 mmol). The nmr was identical with authentic material.

10: IR (υ$_{max}$/cm$^{-1}$, 2% in KBr): 1600, 1493, 1453 (st, polystyrene), 1319, 1147 (st, SO$_2$), 1226 (st, —O-Ph). Sulfur analysis: 2.745% (maximal possible yield: 3.71%)

Methylene-3-oxy-1-phenylsulfone(2'-(N-tetrahydroisoquinoline)ethyl) polystyrene 11

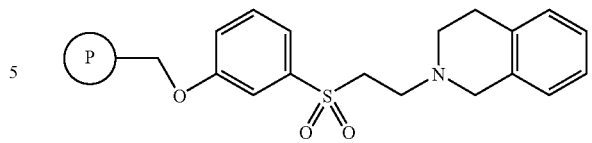

To dry hydroxymethyl polystyrene resin (116 mmol g$^{-1}$, 431 mg) suspended in DCM/THF (1:1) (33 cm$^3$), DIAD (2.5 mmol, 483 mm$^3$), 9 (2.5 mmol, 790 mg) and triphenylphosphine (2.5 mmol, 655 mg) were added slowly. With the addition of triphenylphosphine the sulfone dissolved and the suspension decolourized. After 18 h the resin was filtered and washed with DCM/THF (1:1; 3×40 cm$^3$), THF (50 cm$^3$), DCM (50 cm$^3$), MeOH, iPrOH, THF, DCM, iPrOH, and MeOH, and then again with DMSO, DMF, DCM and MeOH all 50 cm$^3$. The resin was dried at 50° C. under vacuum. Yield 610 mg (max. est. yield: 580 mg).

11: IR (υ$_{max}$/cm$^{-1}$, 2% in KBr): 1600, 1493, 1453 (st, polystyrene), 1312, 1144 (st, SO$_2$), 1247 (st, —O-Ph).

Methylene-3-oxy-1-phenylvinylsulfone polystyrene 12 and N-allyl tetrahydroisoquinoline 4

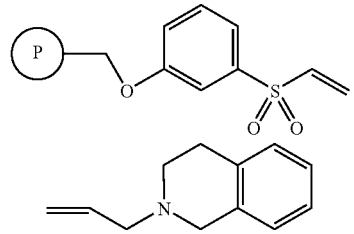

11 (0.97 mmol g$^{-1}$ (est.), 450 mg) in DMF (7 cm$^3$) was treated with allyl bromide (8.75 mmol, 760 mm$^3$) and agitated on a tube rotator for 15 h. The polymere was washed with several small portions of DMF, resuspended in DMF (7 cm$^3$) and treated with methyl iodide (8.75 mmol, 545 mm$^3$) and rotated under light protection for 6 h. The resin, washed with DCM, MeOH and DCM, was resuspended in DCM (7 cm$^3$) and DIPEA (2.93 mmol, 510 mm$^3$) added. The base decolourized the material immediately. After 18 h shaking the resin was drained and washed with DCM and MeOH and dried under high vacuum in an oven at 50° C. Yield of resin 12 401 mg (max. est. yield: 375 mg).

The filtrate was evaporated and gave 167 mg of white solid. It was treated with 2M K$_2$CO$_3$ (10 cm$^3$) and extracted five times into DCM. The combined organic phases were washed with brine and dried over K$_2$CO$_3$. Filtration and removal of the solvent gave colourless 4 (0.28 mmol, 48 mg, 64%) as an oil.

12: IR (υ$_{max}$/cm$^{-1}$, 2% in KBr): 1598, 1493, 1452 (St, polystyrene), 1312, 1141 (st, SO$_2$), 1222 (st, —O-Ph). 4: $^1$H-NMR identical with an authentic sample.

2-Bromoethyl-sulfomethyl polystyrene 13

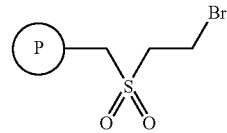

2 (0.6 mmol g$^{-1}$ (est.), 1.6 g) in dry DCM (25 cm$^3$) was treated with PBr$_3$ (10.5 mmol, 1 cm$^3$) and stirred slowly at r. t. for 24 h. The resin was filtered off, washed with DCM (100 cm$^3$) and MeOH (100 cm$^3$). Yield of resin 1.64 g (max. est. yield: 1.66 g).

13: IR ($\upsilon_{max}$/cm$^{-1}$, 2% in KBr): 1601, 1493, 1453 (st, polystyrene), 1326, 1123 (st, SO$_2$), 1074, 1029 (st).

N-Allyl-N, N-di-n-octylamine 14

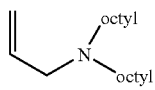

Resin 3 (0.42 mmol g$^{-1}$ (est.), 160 mg) in DMF (2 cm$^3$) was treated with dioctylamine (1.7 mmol, 515 mm$^3$) at 20° C. for 24 h. The resin was washed with DMF (10×5 cm$^3$) and DCM (10 cm$^3$), resuspended in DMF (2 cm$^3$) and treated with allyl bromide (4.25 mmol, 365 mm$^3$) at 20° C. for 24 h. The solvent and the reagent was then removed by filtration and the resin washed with DCM (2×20 cm$^3$). The elimination was performed in DCM (4 cm$^3$) with DIPEA (1.72 mmol, 300 mm$^3$) over night. The filtrate of this last reaction step was combined with the DCM and MeOH wash (25 cm$^3$) from the resin and evaporated. It gave 14 contaminated with DIPEA in 38 mg yield. The amine was transferred in little DCM (<0.5 cm$^3$) to a K$_2$CO$_3$ covered dry silica column (5 g). Impurities were washed away with hexane and the amine eluted with ethyl acetate. After the removal of the solvent 14 (0.043 mmol, 12 mg, 64%) was obtained as a colourless oil. It was contaminated with 5% of 4 of a previous cycle.

IR of resin: identical to f.t. IR of resin 3.

14: $^1$H-NMR (δ/ppm, 300 MHz, CDCl$_3$): 5.86 (ddt, 1H, $^3$J=6.6 Hz, J$^{cis}$=10.15 Hz, J$^{trans}$=16.65 Hz, CH$_2$—CH=CH$_2$), 5.19–5.08 (m, 2H, CH$_2$—CH=CH$_2$), 3.08 (t br, 2H, $^3$J=6.5 Hz, CH$_2$—CH=CH$_2$), 2.42–2.38 (m, 4H, 2×N—CH$_2$—CH$_2$—), 1.47–1.26 (m, 24H, 2×N—CH$_2$—(CH$_2$)$_6$—CH$_3$), 0.87 (t br, 6H, $^3$J=6.73 Hz, N—CH$_2$—(CH$_2$)$_6$—CH$_3$). $^{13}$C-NMR (δ/ppm, 74.76 MHz, CDCl$_3$): 136.34 (—HC=CH$_2$), 116.96 (—HC=CH$_2$), 57.33 (N—CH$_2$—CH=CH$_2$), 53.83 (N—CH$_2$—CH$_2$—), 31.82 (N—CH$_2$—CH$_2$—), 29.53 (N—(CH$_2$)$_2$—CH$_2$—), 29.27 (N—(CH$_2$)$_3$—CH$_2$—), 27.56 (N—(CH$_2$)$_4$—CH$_2$—), 26.87 (N—(CH$_2$)$_5$—CH$_2$—), 22.61 (N—(CH$_2$)$_6$—CH$_2$—), 14.02 (CH$_3$). m/z (CIHRMS) 282.315253 (M$^+$+H, Cl$_{19}$H$_{40}$N requires 282.316076, 100%).

Sulfomethyl-2-(4'-piperazinoacetophenone)ethyl-polystyrene 15

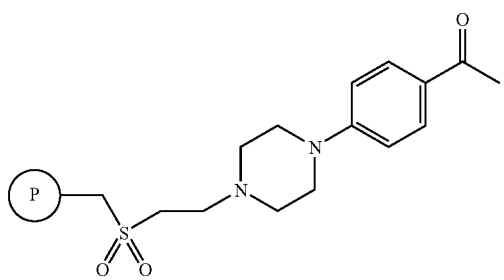

To 3 (0.36 mmol g$^{-1}$ (est.), 260 mg) in DMF (5 cm$^3$) was added 4-piperazinoacetophenone (0.47 mmol, 95.6 mg) and agitated on a tube rotator for 24 h. The resin was drained, washed with DMF, DCM, and MeOH. Yield of resin 278 mg (max. est. yield: 279 mg).

16: IR ($\upsilon_{max}$/cm$^{-1}$, 2% in KBr): 1651 (st, C=O), 1597, 1491, 1449 (st, polystyrene), 1305, 1114 (st, SO$_2$).

Methylene-3-oxy-1-[2'-(4"-piperazinoacetophenone)ethyl]phenylsulfone polystyrene 16

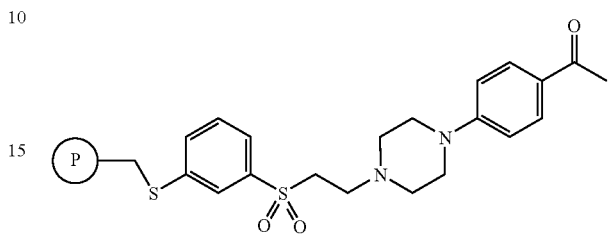

To 12 (0.51 mmol g$^{-1}$ (est.), 128 mg) in DMF (3 cm$^3$) was added 4-piperazinoacetophenone (0.33 mmol, 67 mg). After 24 h the resin was washed with DMF and DCM and finally with MeOH. Yield 136 mg (max. est. yield: 141 mg).

17: IR ($\upsilon_{max}$/cm$^{-1}$, 2% in KBr): 1664 (st, C=O), 1596, 1492, 1452 (st, polystyrene), 1310, 1139 (st, SO$_2$), 1230 (St, O-Ph).

Sulfomethyl-2-[4-piperazino-4-(α-methyl-α-phenyl-benzylalcohol)]ethyl -polystyrene 17

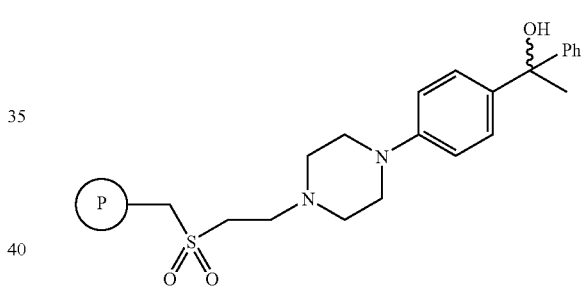

To 15 (0.36 mmol g$^{-1}$ (est.), 156 mg) in dry THF (5 cm$^3$) was added 1M phenylmagnesium bromide in THF (390 mm$^3$) at 0° C. After the addition the ice bath was removed and the reaction stirred for 2 h. It was quenched with 50% aqueous NH$_4$Cl solution (5 cm$^3$). The resin was washed four times with H$_2$O, THF, DCM, MeOH and dried at 50° C. under vacuum. It gave 167.4 mg yellow resin (max. est. yield: 160 mg).

18: IR ($\upsilon_{max}$/cm$^{-1}$, 2% in KBr): 3450 (vst, OH), 1600 (st, polystyrene), 1310, 1139 (st, SO$_2$).

Methylene-3-oxy-1-[2'-(4"-piperazino-4-(α-methyl-α-phenyl-benzylalcohol))ethyl]phenylsulfone polystyrene 18

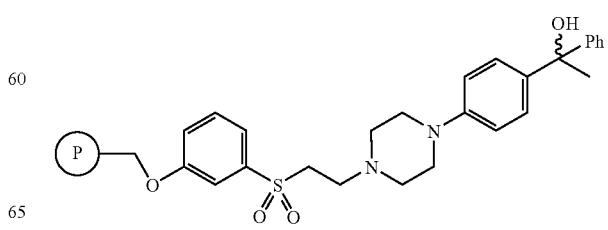

16 (0.51 mmol g$^{-1}$ (est)., 106 mg) was treated in the same way like in the synthesis of 17 with 1M PhMgBr (530 mm$^3$) in dry THF (5 cm$^3$). Yield of resin 107.5 mg (max. est. yield: 110 mg).

19: IR ($\upsilon_{max}$/cm$^{-1}$, 2% in KBr): 3420 (vst, OH), 1698, 1492, 1452 (st, polystyrene), 1306, 1140 (st, SO$_2$), 1223 (st, —O-Ph).

N-Allyl-4-piperazino-4-(α-methyl-α-phenyl-benzylalcohol) 19 from 17 and 18

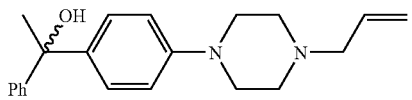

To 17 (0.32 mmol g$^{-1}$ (est.), 160 mg) and 18 (0.5 mmol g$^{-1}$ (est.), 100 mg) were treated with allyl bromide (0.87 mmol, 75 mm$^3$) (0.8 mmol, 70 mm$^3$) in DMF (3 cm$^3$ each) for 24 h. The resins were drained washed with MeOH, DCM and resuspended in DCM (7 cm$^3$). Treatment with DIPEA (0.57 mmol, 100 mm$^3$) (0.5 mmol, 87 mm$^3$) followed by agitation of them at 20° C. for 24 h gave after washings with DCM (15 cm$^3$) and MeOH (10 cm$^3$) the resins 3 and 12. The filtrates were evaporated and the HBr salt of the aminoalcohol 19 was obtained in both cases (8 mg and 12.6 mg respectively).

19 was further purified by applying the salt in DCM (<0.5 cm$^3$) to a dry silica column covered with K$_2$CO$_3$. Impurities were removed by hexane elution, the free amine 19 was eluted with 100% EtOAc. Yield of 19 from 17 (9.3 μmol, 3 mg, 16%) and from 18 (17 μmol, 5.5 mg, 35%) (mp: 146° C.).

19: $^1$H-NMR (δ/ppm, 300 MHz, CDCl$_3$): 7.42–7.20 (m, 7H, aromatics), 6.87–6.85 (m, 2H, aromatics), 5.90 (ddt, 1H, $^3$J=6.59 Hz, J$^{cis}$=10.20 Hz, J$^{trans}$=16.80 Hz, CH$_2$—CH=CH$_2$), 5.25–5.16 (m, 2H, CH$_2$—CH=CH$_2$), 3.22–3.18 (m, 4H, 2×N—CH$_2$—CH$_2$—), 3.05 (d, 2H, $^3$J=6.59 Hz, CH$_2$—CH=CH$_2$), 2.61–2.52 (m, 4H, 2×N—CH$_2$—CH$_2$—), 1.91 (s, 3H, CH$_3$). $^{13}$C-NMR (δ/ppm, 74.76 MHz, CDCl$_3$): 150.23 (N—C=), 148.59 (ipso-phenyl), 139.16 (=C—C(CH$_3$)(OH)Ph), 134.79 (—HC=CH$_2$), 128.16, 126.94, 126.84, 125.99, 118.49 (remaining aromatics), 115.49 (—HC=CH$_2$), 76.96 (C—OH), 61.76 (N—CH$_2$—CH=CH$_2$), 53.01 (Tol-N—CH$_2$—CH$_2$—), 48.82 (Tol-N—CH$_2$—CH$_2$—N-allyl), 30.88 (HO—C(Tol)(Ph)CH$_3$). IR ($\upsilon_{max}$/cm$^{-1}$, 2% in KBr): 3165 (m, OH), 1610, 1515, 1449 (st, =C—H), 1228 (st, N—C). m/z (CIHRMS) 323.211904 (M$^+$+H, C$_{21}$H$_{27}$ON$_2$ requires 323.212339, 85%); 305 (M$^+$+H—H$_2$O, 100%). 3: IR ($\upsilon_{max}$/cm$^{-1}$, 2% in KBr): 3468 (st, OH), 1600, 1491, 1439 (st, polystyrene), 1315, 1120 (st, SO$_2$). 12: IR ($\upsilon_{max}$/cm$^{-1}$, 2% in KBr): 3449 (st, OH), 1600 1493, 1453 (st, polystyrene), 1314, 1144 (st, SO$_2$), 1226 (—O-Ph).

REM resin 20

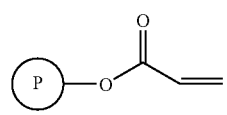

Hydroxymethyl polystyrene (0.8 mmol g$^{-1}$, 1 g) in dry DCM (10 cm$^3$) was treated with DIPEA (6.9 mmol, 1.2 cm$^3$) and acryoyl chloride (6.9 mmol, 560 mm$^3$) at 20° C. After 3 h the resin was filtered off and washed with DCM and MeOH thoroughly. After drying at 50° C. under vacuum 1.08 g of resin 20 was obtained (max. est. yield: 1.015 g).

20: IR ($\upsilon_{max}$/cm$^{-1}$, 2% in KBr): 3440 (vst, OH), 1720 (st, C=O), 1599, 1491, 1438 (st, polystyrene).

Carboxymethyl-2-(N-(ethyl isonipecotate))ethyl polystyrene 21

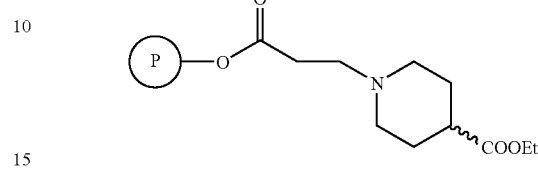

20 (0.77 mmol g$^{-1}$ (est.), 500 mg) in DMF (5 cm$^3$) was treated with ethyl isonipecotate (3.85 mmol, 586 mm$^3$) at 20° C. over night. The resin was then washed with DCM and MeOH and dried under vacuum at 50° C. Yield 546.5 mg (max. est. yield: 565 mg).

21: IR ($\upsilon_{max}$/cm$^{-1}$, 2% in KBr): 3443 (vst, OH), 1735 (st, C=O), 1599, 1491, 1439 (st, polystyrene).

Methylene-3-oxy-1-[N-(2'-(ethyl isonipecotate)ethyl)]phenylsulfone polystyrene 22

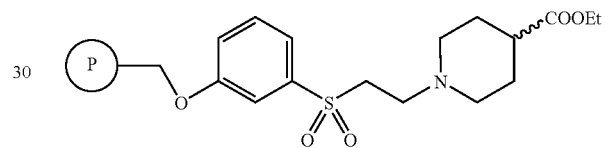

12 (0.7 mmol g$^{-1}$ (est.), 300 mg) was treated with ethyl isonipecotate (3 mmol, 462 mm$^3$) like in the synthesis of 21 and worked up in the same way. Yield 333.5 mg (max. est. yield: 336 mg).

22: IR ($\upsilon_{max}$/cm$^{-1}$, 2% in KBr): 1736 (st, C=O), 1599, 1491, 1438 (st, polystyrene), 1315, 1145 (st, SO$_2$), 1249 (st, —O-Ph).

Carboxymethyl-2-[4-((α,α-diphenyl)methylcohol)piperidine]ethyl polystyrene 23

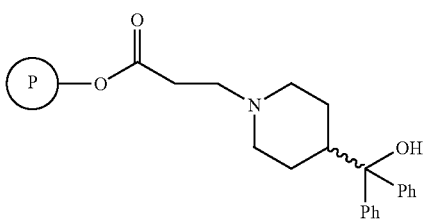

To resin 21 (0.55 mmol g$^{-1}$ mmol (est.), 256 mg) in dry THF (10 cm$^3$) was added 1 M PhMgBr in THF (840 mm$^3$) with slow stirring at 0° C. The ice bath was removed and the suspension stirred for 2 h at 20° C. Addition of 50% aqueous NH$_4$Cl solution (10 cm$^3$) quenched the reaction and the resin was washed with water, THF, DCM and with MeOH. After drying at 50° C. under vacuum yield of resin was 225 mg (max. est. yield: 271 mg).

23: IR ($\upsilon_{max}$/cm$^{-1}$, 2% in KBr): 3448 (vst, OH), 1735 (w, C=O), 1598, 1491, 1438 (st, polystyrene).

Methylene-3-oxy-1-[2'-(4-((α,α-diphenyl)methylalcohol)piperidine)ethyl]phenylsulfone polystyrene 24

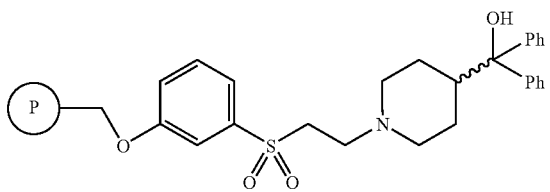

22 (0.63 mmol g$^{-1}$ (est.), 159 mg) was treated in exactly the same way like 21 with 1M PhMgBr solution in THF (600 mm$^3$). Yield of resin 166 mg (max. est. yield: 170 mg).

24: IR ($\upsilon_{max}$/cm$^{-1}$, 2% in KBr): 3448 (st, OH), 1596, 1508, 1438 (st, polystyrene), 1310, 1140 (st, SO$_2$), 1220 (st, —O-Ph).

Cleavage of N-allyl-ethyl isonipecotate 25 and N-allyl4-((α,α-diphenyl)methylalcohol)-piperidine 26 from the resins 21, 22, 23, and 24

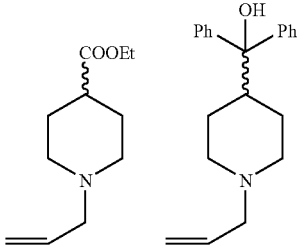

From the resins 21–24 the amines were cleaved in parallel experiments.

21 (0.55 mmol g$^{-1}$ (est), 200 mg) was treated with of allyl bromide (1.65 mmol, 143 mm$^3$) in DMF (4 cm$^3$) for 18 h on a tube rotator. The resin was washed with MeOH and DCM, resuspended in DCM (5 cm$^3$) and treated with DIPEA (0.55 mmol, 96 mm$^3$). After 24 h the resin was washed with DCM and MeOH. The combined filtrates were evaporated and along with the resin dried in an oven at 50° C. under vacuum.

Resins 22 (0.64 mmol g$^{-1}$ (est.), 164 mg), 23 (0.5 mmol g$^{-1}$ (est), 215 mg) and 24 (0.59 mmol g$^{-1}$ (est.), 155 mg) were treated in the same way with allyl bromide (1.57 mmol, 136 mm$^3$; 2.1 mmol, 181 mm$^3$; and 1.5 mmol, 129 mm$^3$ respectively) and with DIPEA (052 mmol, 91 mm$^3$; 0.7 mmol, 122 mm$^3$; and 0.5 mmol, 87 mm$^3$ respectively).

21 gave 26 (49.6 mg) and resin 20 (188.5 mg).
22 gave 26 (36 mg) and resin 12 (188.5 mg).
23 gave 26 (11 mg) and resin 20 (188.5 mg).
24 gave 25 (25.6 mg) and resin 12 (133.7 mg).

The amines were transferred in little DCM (<0.5 cm$^3$) to a dry silica column topped with K$_2$CO$_3$. Impurities were removed by flushing the loaded columns with hexane. The free amines were obtained by ethyl acetate elution and removal of the solvent.

21 gave 26 (0.086 mmol, 16.9 mg, 78%)
22 gave 26 (0.075 mmol, 14.7 mg, 71%)
23 gave 26 (0.016 mmol, 3.2 mg, 20% with regard to 21), 5% of it was 25.
24 gave 25 (0.028 mmol, 8.6 mg, 42% with regard to 22), 10% of it was 26.

12: IR ($\upsilon_{max}$/cm$^{-1}$, 2% in KBr): 3422 (st, OH), 1596, 1492, 1449 (st, polystyrene), 1309, 1139 (st, SO$_2$), 1220 (st, —O-Ph). 20: IR ($\upsilon_{max}$/cm$^{-1}$, 2% in KBr): 3432 (vst, OH), 1719 (w, C=O), 1588, 1490, 1438 (st, polystyrene). 25: $^1$H-NMR (δ/ppm, 300 MHz, CDCl$_3$): 5.86 (ddt, 1H, $^3$J=6.59 Hz, J$^{cis}$=10.15 Hz, J$^{trans}$=17.10 Hz, CH$_2$—CH=CH$_2$), 5.2–5.10 (m, 2H, CH$_2$—CH=CH$_2$), 4.12 (q, 2H, $^3$J=7.14 Hz, O—CH$_2$), 2.97 (dt, 2H, $^3$J=6.6 Hz, $^4$J=1.37 Hz, CH$_2$—CH=CH$_2$), 2.87 (dt, 2H, $^3$J=3.44 Hz, $^2$J=11.80 Hz, 2×N—CHH—CH$_2$—), 2.26 (tt, 1H, $^3$J=4.12 Hz, $^3$J=11.00 Hz, EtOOC—CH), 2.05 (dt, 2H, $^3$J=2.56 Hz, $^2$J=11.50 Hz, 2×N—CHH—CH$_2$—), 1.93–1.69 (m, 4H, N—CH$_2$—CH$_2$—), 1.24 (t, 3H, $^3$J=7.01 Hz, O—CH$_2$—CH$_3$). $^{13}$C-NMR (δ/ppm, 74.76 MHz, CDCl$_3$): 175.31 (C=O), 135.39 (—HC=CH$_2$), 117.86 (—HC=CH$_2$), 62.03 (N—CH$_2$—CH=CH$_2$), 60.27 (O—CH$_2$—), 52.87 (N—CH$_2$—CH$_2$—), 41.00 (EtOOC—CH), 28.21 (N—CH$_2$—CH$_2$—), 14.14 (CH$_3$). 26: $^1$H-NMR (δ/ppm, 300 MHz, CDCl$_3$): 7.49–7.45 (m, 4H, aromatics), 7.31–7.26 (m, 4H, aromatics), 7.20–7.14 (m, 2H, aromatics), 5.86 (ddt, 1H, $^3$J=6.60 Hz, J$^{cis}$=10.20 Hz, J$^{trans}$=17.00 Hz, CH$_2$—CH=CH$_2$), 5.20–5.09 (m, 2H, CH$_2$—CH=CH$_2$), 2.98 (d, 2H, $^3$J=6.90 Hz, CH$_2$—CH=CH$_2$), 2.97–2.88 (2H, m, 2×N—CHH), 2.47–2.38 (1H, m, HC—C(Ph)$_2$OH), 2.00–2.60 (m, 6H, 2×N—CHH$_2$—CH$_2$—). This compound contains 10% 25.

Carboxymethyl-2-tetahydroisoquinoine)ethyl polystyrene 27

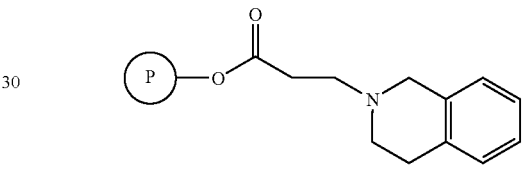

27 was synthesised like 21 using resin 20 (0.77 mmol g$^{-1}$ (est.), 219 mg). Reaction resulted in 238 mg of resin (max. est. yield: 242 mg).

27: IR ($\upsilon_{max}$/cm$^{-1}$, 2% in KBr): 3440 (st, OH), 1720 (st, C=O), 1599, 1491, 1438 (st, polystyrene).

Stability investigation of the resins 11 and 27

Treatment with 95% TFA 11 (0.97 mmol g$^{-1}$ (est), 65 mg) was treated for 2 h at 21° C. with 95% aqueous TFA (3 cm$^3$). The resin was drained and washed with DCM (10 cm$^3$) and MeOH (10 cm$^3$). The combined filtrates were evaporated at 45° C. Yield of TFA salt of 9 (0.046 mmol, 20 mg, 73%). It contained impurities.

27 (0.7 mmol g$^{-1}$ (est), 70 mg) was treated in the same way and gave 5 mg of unidentified oil.

27: IR ($\upsilon_{max}$/cm$^{-1}$, 2% in KBr): 3448 (st, OH), 1654 (m), 1600, 1491, 1425 (st, polystyrene). 11: IR ($\upsilon_{max}$/cm$^{-1}$, 2% in KBr): 3456 (vst, OH), 1685 (st), 1599, 1508, 1449 (st, polystyrene), 1310, 1137 (w, SO$_2$), 1249. 9 from 11: $^{13}$C-NMR (δ/ppm, 74.76 MHz, (D$_6$)DMSO): 158.21 (=COH), 139.36 (=CSO$_2$), 135.03/134.4.1 (C$^{2'}$/C$^{6'}$, THIQ), 128.54 (C$^5$), 127.68 (C$^4$, THIQ), 126.61 (C$^5$, THIQ), 126.42 (C$^6$, THIQ), 121.20 (C$^4$), 121.43 (C$^3$, THIQ), 118.0 (C$^6$), 113.99 (C$^2$), 52.38 (SO$_2$—CH$_2$), 49.66 (N—CH$_2$-Ph), 49.23 (—SO$_2$—CH$_2$—CH$_2$—N), 48.43 (N—CH$_2$—CH$_2$-Ph), 25.15 (N—CH$_2$—CH$_2$-Ph).

Treatment with MeONa

To 27 (0.7 mmol g$^{-1}$ (est), 50 mg) in THF (3 cm$^3$) was added MeONa (0.75 mmol) in MeOH (300 mm$^3$). After 3 h the resin was washed with MeOH and DCM and dried at 50° C. in a vacuum oven. Yield of resin 35 mg. The filtrate contained a methyl ester.

11(0.97 mmol g$^{-1}$ (est), 50 mg) was treated with the same amount of MeONa in MeOH in THF (3 cm$^3$). It yielded 42 mg resin and 2 mg of an oil which did not contain a methoxygroup.

27: IR ($\upsilon_{max}$/cm$^{-1}$, 2% in KBr): 3434 (vst, OH), 1631 (m), 1600, 1500, 1450 (st, polystyrene). 11: IR ($\upsilon_{max}$/cm$^{-1}$, 2% in KBr): 3450 (w, OH), 1598, 1500, 1451 (st, polystyrene), 1306, 1140 (st, SO$_2$), 1215. $^1$H-NMR of the cleaved material from resin 27 shows in CD$_3$OD a methylester with OMe at 3.52 ppm and the expected aromatics from 7.85 to 7.182 ppm along with alkyl protones between 3.07 and 2.60 ppm.

What is claimed is:

1. A divinylbenzene cross-linked polystyrene polymer comprising a side chain of formula I:

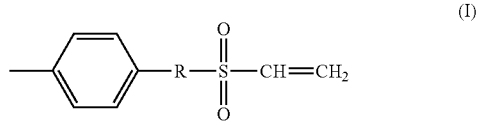

(I)

wherein group R is an alkyl, aryl, oxyalkyl or oxyaryl linker group.

2. A divinylbenzene cross-linked polystyrene polymer as claimed in claim 1 having a backbone comprising an ethylene grouping which is attached to the side chain.

3. A divinylbenzene cross-linked polystyrene polymer as claimed in claim 1 wherein group R is a C$_{1-10}$ alkyl or oxyalkyl group.

4. A divinylbenzene cross-linked polystyrene polymer as claimed in claim 3 wherein group R is a C$_{1-6}$ alkyl group.

5. A divinylbenzene cross-linked polystyrene polymer as claimed in claim 4 wherein said side chain is of formula II;

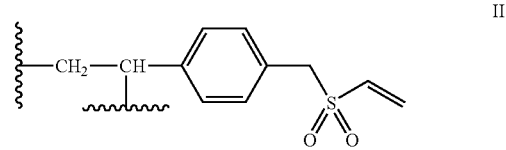

II wherein _(CH$_2$—CH)_ is part of the backbone of the polymer.

6. A divinylbenzene cross-linked polystyrene polymer as claimed in claim 1 wherein said side chain is of formula III:

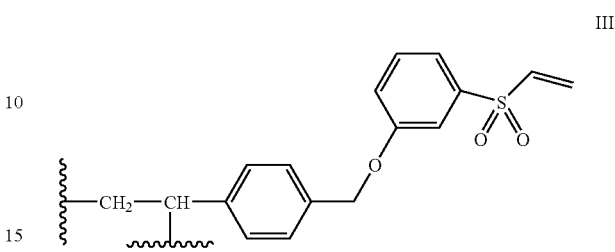

III wherein _(CH$_2$—CH)_ is part of the backbone of the polymer.

7. A divinylbenzene cross-linked polystyrene polymer as claimed in claim 1 in the form of a resin suitable as a support for solid phase chemical reactions.

8. A method of producing a divinylbenzene cross-linked polystyrene polymer as claimed in claim 1 wherein a Merrifield resin is reacted to replace the chlorine atom thereof with a sulphur containing group which is subsequently oxidised to yield a vinyl sulphone moiety of formula I.

9. A method of producing a solid-phase reactant for a solid-phase chemical reaction, said reactant comprising a complex of a substrate moiety and a resin comprising a polymer as claimed in claim 1, wherein said complex is produced by reacting a precursor substrate with a functional group on the resin.

10. A method of chemical synthesis involving a chemical reaction wherein one of the substrates of said reaction is in the form of a solid-phase complex with a resin comprising a polymer as claimed in claim 1.

11. A microreactor comprising a resin material as a support matrix for a solid-phase chemical reaction, wherein said main material Comprises a polymer as claimed in claim 1.

* * * * *

UNITED STATES PATENT AND TRADEMARK OFFICE
CERTIFICATE OF CORRECTION

PATENT NO.        : 7,183,367 B2
APPLICATION NO.   : 10/799912
DATED             : February 27, 2007
INVENTOR(S)       : Gani et al.

It is certified that error appears in the above-identified patent and that said Letters Patent is hereby corrected as shown below:

Claim 5, Formula II:

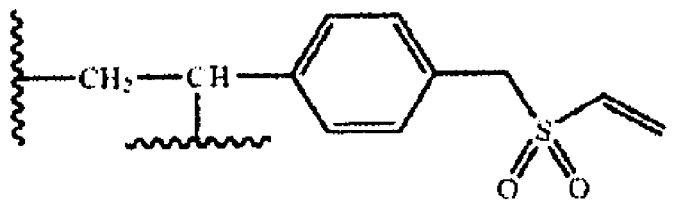

should read

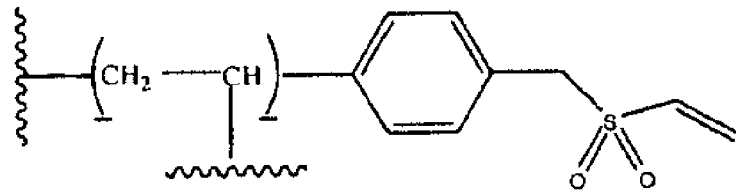

UNITED STATES PATENT AND TRADEMARK OFFICE
CERTIFICATE OF CORRECTION

PATENT NO. : 7,183,367 B2 Page 2 of 2
APPLICATION NO. : 10/799912
DATED : February 27, 2007
INVENTOR(S) : Gani et al.

It is certified that error appears in the above-identified patent and that said Letters Patent is hereby corrected as shown below:

Claim 6, Formula III:

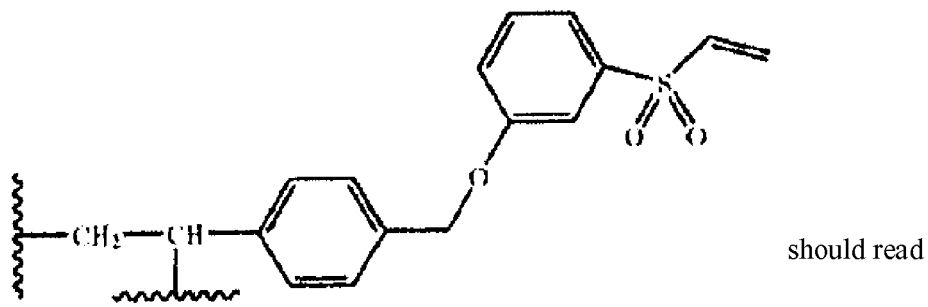

should read

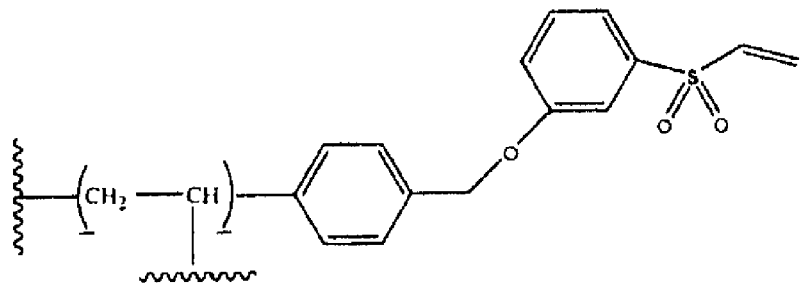

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,183,367 B2  
APPLICATION NO. : 10/799912  
DATED : February 27, 2007  
INVENTOR(S) : Gani et al.

It is certified that error appears in the above-identified patent and that said Letters Patent is hereby corrected as shown below:

Column 23, Claim 5, Formula II:

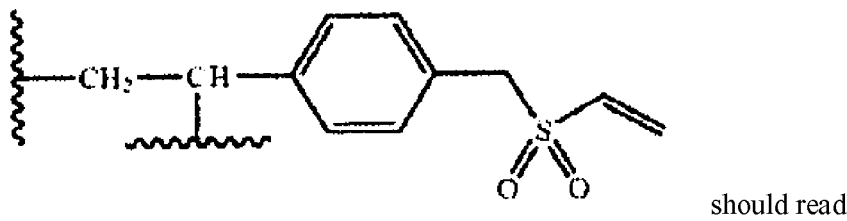   should read

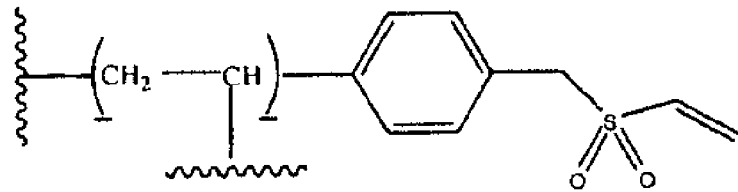

UNITED STATES PATENT AND TRADEMARK OFFICE
CERTIFICATE OF CORRECTION

PATENT NO. : 7,183,367 B2 Page 2 of 2
APPLICATION NO. : 10/799912
DATED : February 27, 2007
INVENTOR(S) : Gani et al.

It is certified that error appears in the above-identified patent and that said Letters Patent is hereby corrected as shown below:

Column 24, Claim 6, Formula III:

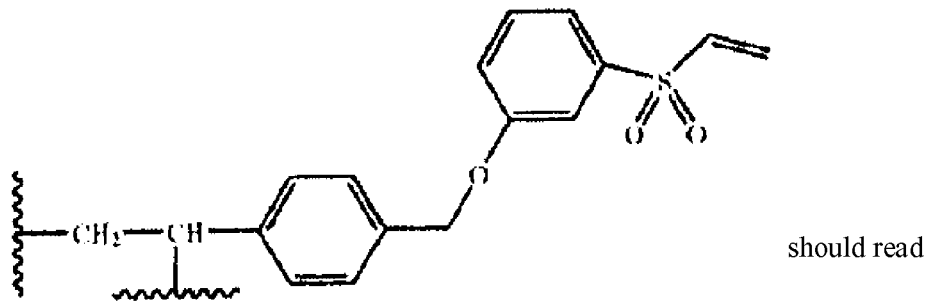

should read

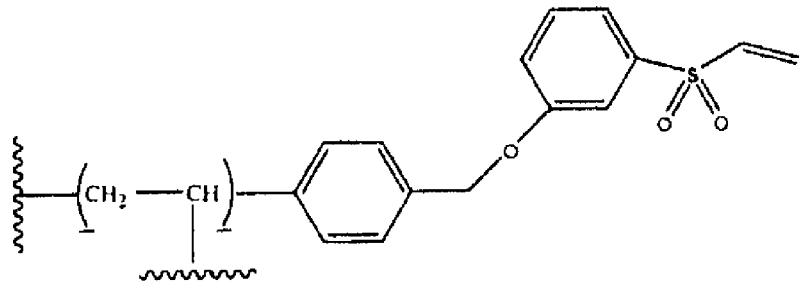

This certificate supersedes the Certificate of Correction issued July 1, 2008.

Signed and Sealed this

Twenty-second Day of July, 2008

JON W. DUDAS
*Director of the United States Patent and Trademark Office*